Figure 1:
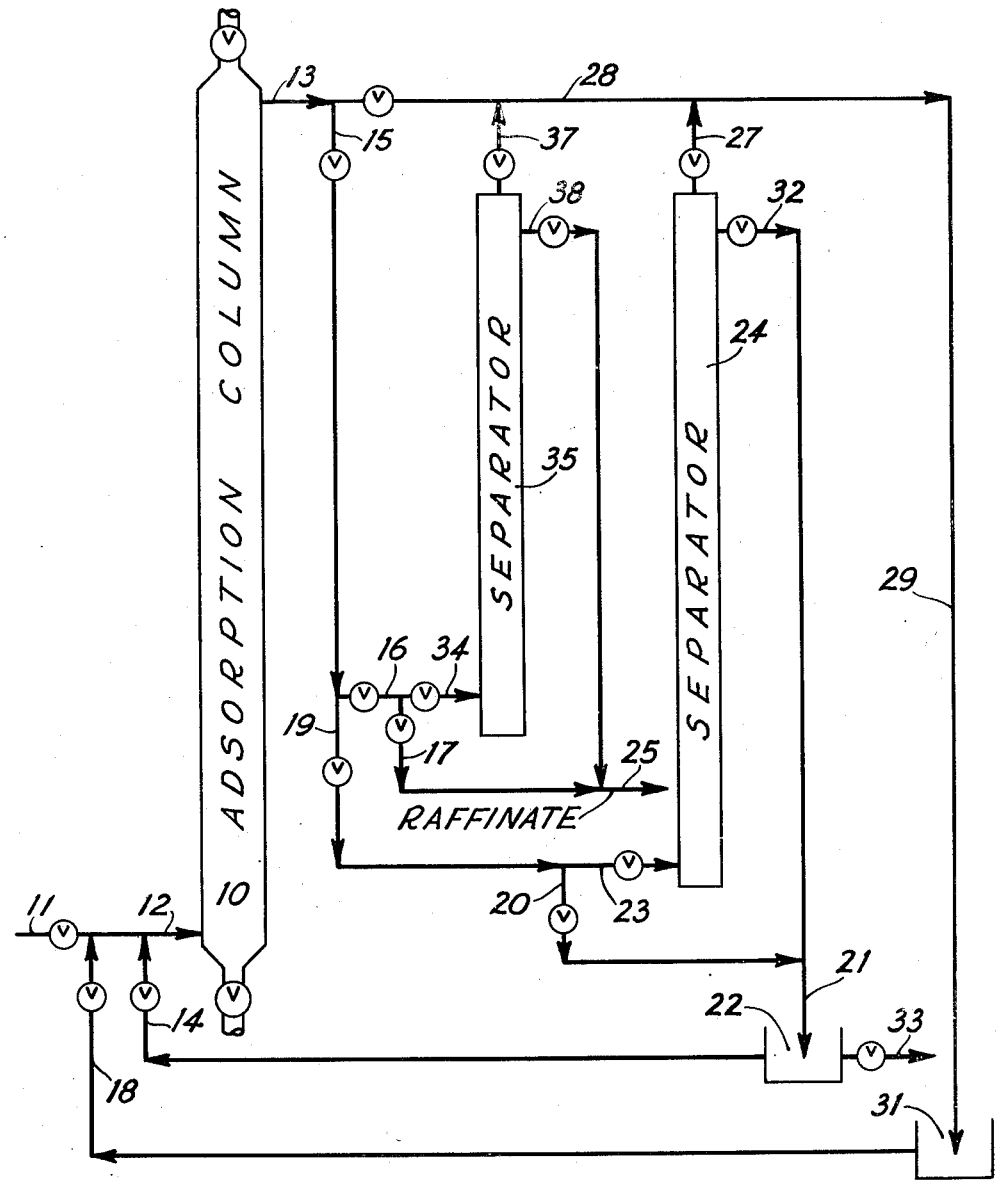

Patented Jan. 15, 1952

2,582,415

UNITED STATES PATENT OFFICE 2,582,415

ADSORPTION PROCESS FOR THE SEPARATION OF HYDROCARBONS

William H. Claussen, Berkeley, Calif., assignor to California Research Corporation, San Francisco, Calif., a corporation of Delaware Application October 15, 1945, Serial No. 622,324

14 Claims. (Cl. 196—147)

This invention relates to an adsorption process for the fractionation of fluid compositions, and, more particularly, to a process for the reactivation of the adsorbent material used in such a fractionation process.

The basic steps involved in the physical process of adsorption have been the subject of intensive study for the past twenty years. Many laboratory methods have been developed for analysis and separation of hydrocarbon fluids by means of adsorption, and some commercial use has been made of adsorption methods.

Numerous patents have been issued and many articles have been written on various methods of reactivating spent adsorbent. It has been suggested, for example, that the adsorbent be reactivated by washing with an aqueous soap solution, a dilute acid solution, a pine oil mixture, dihydric alcohols, just plain water, and many other mixtures. It has also been suggested that the adsorbent be reactivated by treating with high temperature steam, by hot gases, or by burning off the contaminating extract or more commonly, that it be thrown away when exhausted and a new batch used.

Reactivation of the adsorbing material, however, has been a different problem and each of the heretofore proposed regeneration processes has its own serious faults. Such complex processes of adsorbent reactivation as washing with pine oil, aqueous soap solutions, dihydric alcohols, and other very strongly adsorbed solutions are generally not used, since the problems involved in desorbing these desorbents are more complex than the original reactivation problem. Aqueous desorbents, in general, have proved unsatisfactory for desorbing organic compounds due, in part, to the low mutual solubility and hence slow rate of desorption.

Reactivation of the adsorbent by burning, hot gas stripping, super-heated steam stripping or any high temperature regeneration process in general is particularly disadvantageous when dealing with heat-sensitive organic compounds and fragile adsorbents. Regeneration by burning obviously destroys the extract on the adsorbent and very frequently does permanent damage to the adsorbent itself. This practice is expensive at best, and in most cases, particularly when separation rather than purification is the desired operation, reactivation by burning is economically impossible. This is also frequently true of regeneration at high temperatures such as by hot gases or high temperature steam. The products removed are very likely to be destroyed or altered by the excessive heat, and very little, if any, recovery of removed material is accomplished. On the other hand, very high temperatures produced by direct burning or indirect heating are detrimental to the adsorbitivity of the adsorbent treated. Active carbon, for instance, is not generally usable in these reactivation schemes, since it is destroyed by direct burning, and, in some instances, even high temperature regeneration. Moreover, a high temperature reactivation process requires special, and often complicated, apparatus to attain and hold these high temperatures.

The use of low temperature steam has been advocated and has some advantages over high temperature reactivation. Low temperature steam, however, has a tendency to condense on the adsorbent, the water thus formed is very difficult to remove, and often does permanent damage to the adsorbent. Moreover, when the adsorbent is to be used for fractionating organic compounds, a large flow of a drying gas is necessary to remove deleterious traces of water from the steam stripped adsorbent. This practice is necessary since the efficiency of the adsorbent for fractionation of organic compounds is markedly decreased by any water vapor present because of reduced adsorbing capacity.

Gas treatment, either direct hot gas stripping or gas drying of stripped adsorbent, also presents difficulties. The gas treated adsorbent necessarily contains adsorbed gas which must be displaced by liquid at some point in the process. If this is allowed to take place in the adsorption column itself, the liberated gas causes operating difficulties and may dissolve in the raffinate requiring subsequently purification steps. If this adsorbed gas is displaced before entering the adsorption column, such as by treating the regenerated adsorbent with raffinate, an undesirable extra process step is involved.

In addition to the above difficulties, a dry adsorbent as produced by any of the above reactivation methods is in an undesirable condition since it is subject to contamination from such sources as the moisture of the air, etc.

It is, therefore, an object of this invention to provide a simple method for the reactivation of a spent adsorbent.

It is a further object of this invention to provide a method capable of recovering in substantial amount the extract desorbed from a spent adsorbent.

It is another object to provide a process for the low temperature reactivation of a spent adsorbent.

It is still another object of this invention to provide a reactivation process in which the adsorbent is reactivated without appreciable loss of adsorbtive power.

It is another object of this invention to provide a reactivation process which eliminates all use of vapors and gases either for stripping or drying the adsorbent.

In an adsorption fractionation process contact of the fluid composition undergoing separation with the solid adsorbent results in the separation of a preferentially adsorbed fraction held on the adsorbent which may be described as an adsorbate or adsorption extract and of a non-adsorbed residual liquid comprising the non-preferentially adsorbed components of the fluid composition which may be described as an adsorption raffinate. The adsorption extract and adsorption raffinate fractions separated are hereinafter referred to simply as the "extract" and "raffinate."

In accordance with these and other objects, which will be obvious from the disclosure given, this invention pertains to a fractionation process in which a raffinate fraction and an extract fraction are separated by an active adsorbent material, and consists in the step of reactivating the spent adsorbent material containing said extract fraction, which comprises contacting said adsorbent material with a liquid stripping agent which is less strongly adsorbed than said extract fraction and removing said extract fraction from said adsorbent with said liquid stripping agent, thereby restoring said adsorbent's activity and rendering it ready for re-use.

Figure 2:
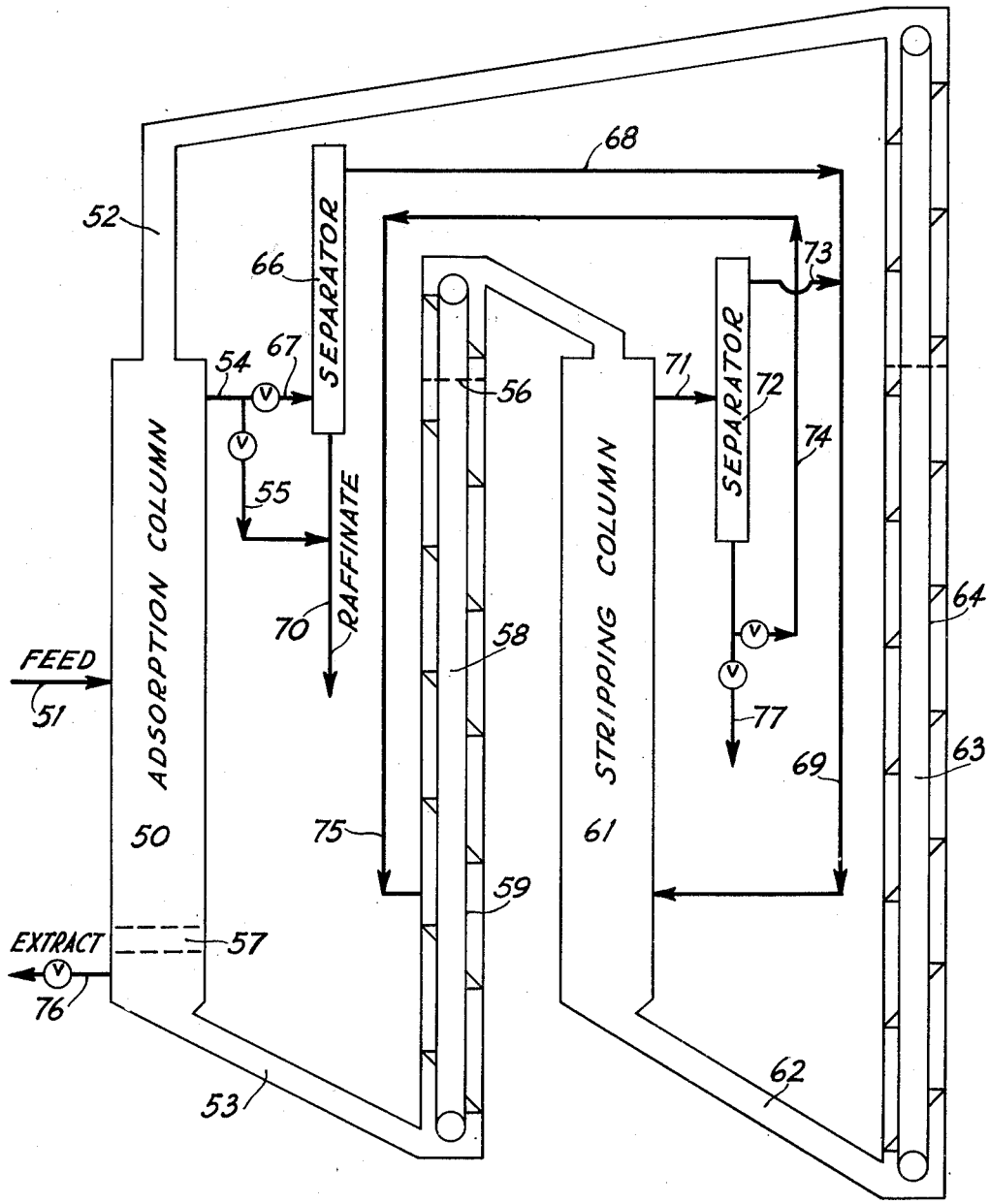

The accompanying drawings will aid in the description of this invention. Figure 1 shows, in elevation, a batch operation adapted to be used with this process. Figure 2 shows, in elevation, a continuous operation utilizing the regeneration feature of this process.

Referring to Figure 1, the liquid stock to be treated is fed to adsorption column 10 containing fresh adsorbent via valve controlled line 11 and column inlet line 12. The feed stock is passed up through column 10 until raffinate appears at outlet 13. The feed is then stopped and extract (such as that produced in a previous run) is fed from tank 22 via valve controlled line 14 and inlet line 12 up adsorption column 10. Raffinate is thus displaced from the adsorbent and is removed via exit line 13 and valve controlled lines 15, 16 and 17 and raffinate line 25. When the extract has substantially completely displaced the raffinate from the adsorbent, the extract flow is stopped and a liquid stripping agent is passed up the column from tank 31 via valve controlled line 18 and inlet line 12. Reasonably pure extract displaced may be conducted via exit line 13, valve controlled lines 15, 19 and 20 and line 21 to extract storage tank 22. When stripper appears with the extract at exit line 13, the mixture is led via valve controlled lines 15, 19 and 23 to separator 24. The stripper and extract are separated to the desired degree by a means adapted to this separation, as pointed out below. Stripper is removed via valve controlled lines 27, 28 and 29 to stripper storage 31. Extract is removed via valve controlled line 32 and line 21 to extract storage tank 22. Net extract may be removed from the tank via valve controlled line 33. When extract has been substantially completely removed from the adsorbent (as indicated by substantially no extract in the exit stream in line 13, feed stock is again admitted via valve controlled line 11 and inlet line 12 to column 10. If substantially pure stripper is displaced, it is removed from exit line 13 via valve controlled line 28 and line 29 to stripper storage tank 31. When substantial quantities of raffinate appear in the stripper being removed from line 13, the mixture is taken from exit line 13 via valve controlled lines 15, 16 and 34 to separator 35. Stripper is removed via valve controlled line 37 and lines 28 and 29 to stripper storage tank 31. Raffinate is removed via valve controlled line 38 to raffinate exit line 25. If a substantially pure raffinate stream is produced, it may be removed via lines 13, 15, 16, 17 and 25 as before. The cycle may be repeated, as desired.

Figure 2 shows a second use of liquid stripping as applied to a continuous process. In this case, the liquid to be fractionated is fed to adsorption column 50 via feed inlet 51. Fresh adsorbent is passed from tube 52 downward through column 50 to tube 53. Raffinate is removed from the column via line 54, valve controlled line 55, and raffinate exit line 70. Extract is carried down the column with the adsorbent and collects in extract zone 57 which is maintained constant by the static head of extract 56 in extract leg 58. The adsorbent containing extract is lifted by elevator 59 through extract leg 58 to the top of stripping column 61. Here the adsorbent is stripped of extract while passing down the column by means of a liquid stripping agent which is passing up the column. The reactivated adsorbent containing stripper passes through tube 62 to stripper leg 63 where it is carried by elevator 64 to tube 52. Stripper containing adsorbent is then passed into column 50 as was fresh adsorbent. When stripper containing adsorbent reaches the column, however, the stripper is desorbed by and removed with the raffinate and the mixture is fed to separator 66 via line 54 and valve controlled line 67. The stripper and raffinate are separated, stripper being recirculated via lines 68 and 69 to stripping column 61, raffinate being removed via line 70.

Stripper containing extract removed from stripping column 61 via line 71 is fed to separator 72 where stripper is recirculated via lines 73 and 69 to stripping column 61 while extract is fed to leg 58 via valve controlled line 74 and line 75. Net extract may be removed either from adsorption column 50 via valve controlled line 76 or from separator 72 via valve controlled line 77.

It will be noted that both the batch and continuous units in Figures 1 and 2 are shown for a system wherein the density of the extract is approximately equal to or greater than the density of the raffinate (which is the usual case). If, however, the density of the raffinate is substantially greater than the density of the extract, or in general, if in any stage of the process the density of the liquids involved is exerting a force counter to normal operation, it may be preferable to alter adsorption column operation. For example, in the batch unit, if the raffinate density were greater than the extract density, this alteration would entail reversing the described direction of liquid flow, or, in other words, feeding at the top of the column and removing the products from the bottom of the column. In the continuous unit it might be preferable to pass the adsorbent up the adsorption column, removing extract from the top and raffinate from the bottom of said column if the density of the raffinate were substantially greater than the density of the extract.

A discussion of the variables of the process will be given in order that the invention may be more fully understood.

When certain solids are contacted with a liquid, a portion of the liquid is firmly held or adsorbed to the surface of said solid, this phenomenon of adsorption being, in part, due to forces in the solid which are not satisfied in the solid surface and which extend out into the liquid phase. Nearly all solids show some adsorptive power, but this power is not of sufficient magnitude to be useful unless the adsorbent has a very high surface area per unit volume. This high area per unit volume may be due to extremely fine particle size or preferably to a porous structure. Surface area, however, is only one of the factors contributing to adsorption phenomena. Other important factors are pore size (particularly when pore size approximates molecular size, ionic lattices, and Van der Waal's forces. Examples of solids that are suitable as adsorbents are activated carbon, silica gel, magnesia, and the like. These adsorbents may be granular, powdered, bead or pelleted form.

Adsorbents are useful for fractionating two or more component mixtures due to the fact that adsorbent surfaces attract some compounds more strongly than others. Although some variation exists in the order of adsorption, in general, adsorbents have been found to most strongly or preferentially adsorb compounds with molecular structures having a high dipole moment or high electrical polarizability. This degree of adsorption is influenced by the molecular structure of the different compounds. For example, the following classes of hydrocarbons are preferentially adsorbed in the order shown in Table I:

Table I

Paraffins
Naphthenes
Olefins
Cyclic olefins
Aromatics

Table I is arranged in order of replaceability, that is, any member in the series will be replaced by a member falling lower in the series. The farther apart any two members fall in Table I, the greater the ease of fractionation by adsorption. However, a successful fractionation, it has been found, is not only dependent on the series given in Table I but is, in fact, dependent on the coordination of operating variables.

Many liquid stripping agents have been studied in conjunction with specific adsorbents for use in processes for the fractionation of organic compounds. A general theory has been formulated to aid in selecting a suitable liquid stripping agent and adsorbent for a given fractionation, and in addition a specific confirmatory test has been devised to facilitate this selection.

The first consideration in any proposed adsorption system with a given adsorbent is necessarily whether or not the components present in the given mixture are adapted to fractionation by adsorption. The adsorption isotherm of an A—B mixture (that is volume of B adsorbed per gram of adsorbent plotted against concentration of B), may be used to ascertain the suitability of adsorption fractionation for the treatment of proposed mixture. This isotherm is determined under condition of temperature and pressure similar to plant operating condition, and gives an indication of the weight of adsorbent necessary to accomplish the desired fractionation in a batch operation or in a continuous system, to determine the relative rates of flow of adsorbent and feed in a given column to effect the desired separation. Other factors, however, affect the determination of weight of adsorbent or relative rates of flow. For example, the actual processes of adsorption and desorption have been found to take place over a finite distance of the adsorption column, giving rise to areas of mixed composition. These areas of mixed composition are caused principally by such factors as slow diffusion into the adsorbent from the body of the liquid and uneven liquid flow and the extent of these areas, it has been found, may be calculated by the use of known physical principles. It has also been found that operating lines and transfer coefficients may be calculated in a manner similar to standard fractional distillation equipment design procedure. The above outlined factors may be combined to give operation characteristics for the desired adsorption fractionation step.

The second consideration in a proposed adsorption fractionation system with a given adsorbent is the step of regenerating the spent adsorbent. As have been pointed out above, the step of regenerating a spent adsorbent has posed a complex problem. Heretofore, so far as known, it has been thought necessary to use as a reactivating agent a compound preferentially adsorbed by the particular adsorbent than the extract to be removed, or to use a high temperature vapor or gas stripping operation, or even to combine these two operations. It is of the essence of this invention that it has been found possible to regenerate a spent adsorbent without using a preferentially adsorbed compound, nor a high temperature stripping operation. In fact, the process of this invention utilizes a liquid stripping agent which is less strongly adsorbed than the extract fraction of the mixture being fractionated and which will strip the extract at normal or slightly elevated temperatures. In addition, the present process affords a method of reactivation wherein the adsorbent material is protected by a liquid during the entire operation of the process, thereby substantially completely eliminating possibility of contamination of the adsorbent. Furthermore, the liquid stripping agent employed acts as an excellent heat transfer medium, which fact is of tremendous advantage when the adsorbent bed is to be heated above room temperature for the stripping operation.

It has been discovered that advantage can be taken of the equilibrium existing between the extract held on the adsorbent and the less strongly adsorbed liquid surrounding the adsorbent. This equilibrium, it has been found, can be displaced by the presence of an excess of less strongly adsorbed liquid (stripping agent) to such an extent that the extract is substantially completely replaced from the adsorbent by the liquid stripping agent. Thus, for example, aromatic compounds adsorbed from a kerosene cut may be successfully stripped from the adsorbent by 5 volumes of a liquid stripping agent (such as iso-octane) per volume of adsorbent at room temperature.

It is a distinct advantage of this invention that reactivation of the spent adsorbent may be accomplished at a low temperature. Frequently room temperature is sufficient to effect the desired stripping. In some instances, however, it will be found advantageous to utilize slightly elevated temperatures. For example, it has been found that when iso-octane is used to strip an adsorbent containing the extract produced by a kerosene fractionation, the adsorbent has regained 66% of its activity when stripped for 10 hours at 70° F. whereas the same adsorbent has regained 90% of its activity when stripped at 212° F. for 10 hours. It has also been found, however, that in stripping this kerosene extract with iso-octane, no particular advantage is obtained by utilizing temperatures substantially higher than 300° F. It has been found, for example, that an adsorbent reactivated as outlined above for 10 hours at 320° F. has substantially the same activity as when it is reactivated at 212° F. for 10 hours. In general, it has been found that low to moderate temperatures (i. e. up to about 300° F.) are preferable in the practice of this liquid stripping operation.

The heat for the stripping operation may be supplied by any conventional means adapted to this particular process. The adsorbent column may be heated directly, the liquid stripping agent may be introduced hot, or a combination of these methods may be used. Steam coils imbedded in the adsorbent body offer a convenient means of heating to the desired moderate temperatures.

The adsorbent body may be cooled after reactivation by any conventional means adapted to this particular case. It is frequently advantageous to cool the adsorbent by flushing with cold liquid stripping agent. In the continuous unit it is frequently not necessary to cool the adsorbent in the stripping column since the passage of adsorbent to the adsorption column will provide some cooling toward the temperature at which the adsorbent desirably enters the adsorption column. In some cases it may be desirable to add a refrigeration section to the unit in order to more advantageously carry out a desired fractionation.

In general, in the practice of this invention the two main considerations for a suitable liquid stripping agent are that it must be less strongly adsorbed by a given adsorbent than the extract fraction of the stock to be treated, and that it must be readily separable from and at least somewhat mutually soluble with both raffinate and extract fractions. It is also preferable that the chosen liquid stripping agent should be so chosen that it will adequately remove the extract from the adsorbent with a reasonable volume ratio at operating temperatures.

In accordance with the first requirement, a suitable liquid stripping agent must be less strongly adsorbed by the given adsorbent than the extract fraction in order that the liquid stripping agent held on the adsorbent after reactivation may be readily desorbed by said raffinate in the succeeding step of the process. The choice of a suitable liquid stripping agent to meet this first requirement may be aided in a general way by reference to Table I. More specifically it has been found that compounds normally occurring in petroleum fractions, for examples, and compounds useful as liquid stripping agents for petroleum fractions, can be arranged with regard to their replaceability from a given adsorbent, such as silica gel, in a series determined by theoretical and experimental data. Table II shows a few compounds in such a series.

*Table II*

Pentane          Isooctane
Carbon tetrachloride
Cyclohexene
Benzene
Toluene
Dibutyl ether
Cyclohexanol
Dioxane
Furfural
Ethyl alcohol Tables I and II are made up with the aid of the theoretical discussion of adsoption phenomena given hereinabove with the additional aid of specific tests. A suitable test can be conducted by adding a known concentration of the two liquids in question to a flask containing the given adsorbent, let stand two hours, analyze the resulting solution, and from the change in concentration, calculate which of the two components is the more strongly adsorbed.

Tables I and II and similarly constructed tables may be used to aid in determining an appropriate stripping agent, for a given fractionation process, which meets the first requirement. The lower a member falls in the table, the more strongly it is adsorbed. Therefore, a suitable liquid stripping agent for a given fractionation will fall in the table above the extract to be produced by the fractionation in question. As specific illustrations of this use of these tables, in an isooctane-toluene fractionation, pentane and carbon tetrachloride are suitable liquid stripping agents.

The second general requirement of a suitable liquid stripping agent is that it will be readily separable from and at least somewhat mutually soluble with both raffinate and extract fractions. The liquid stripping agent must be readily separable from both these fractions since at certain stages in the operation of the process of this invention liquid stripping agent appears in both the raffinate and extract exit streams, and said liquid stripping agent must be readily separable therefrom in order that substantially pure raffinate and extract may be produced. This separation of liquid stripping agent and raffinate or extract may be carried out by any conventional type of process adapted to this particular separation. For example, this separation may be accomplished by such well known processes as fractional distillation, solvent extraction, fractional crystallization and the like.

In addition to being readily separable, it is necessary that the liquid stripping agent be at least somewhat mutually soluble in both raffinate and extract in order that the displacing liquid may readily penetrate to the surface of the adsorbent and remove the extract therefrom, and that it may be readily replaced by the raffinate. The higher the degree of mutual solubility the better, with the most preferable condition being mutual miscibility at operating temperatures. The determination of suitability of a liquid stripping agent according to the above discussed second requirement may be made with physical property data.

It is also preferable that a proposed liquid stripping agent be able to substantially completely remove the extract from the adsorbent with a reasonable volume ratio at operating temperatures. A liquid stripping agent having these qualifications may be found with the aid of the tables, and, if necessary, confirmation by a small scale test. The tables not only indicate the order of replaceability, as noted, but, to some extent, the rate of replaceability. The closer the proposed stripping agent falls above the extract in the tables, the more rapid the stripping tends to be. Thus, from Table II in a dioxane-dibutyl ether fractionation wherein dioxane is the extract fraction, benzene will substantially completely remove the dioxane with about half the relative volume that will be necessary if isooctane is used as the stripping agent. A simple test, as described hereinbelow, will serve to give further data on the choice of stripping agent.

It is frequently advantageous to subject a liquid stripping agent which meets all of the above requirements to a simple test to confirm suitability and to secure data on rates of flow, volume of stripping agent necessary, etc. A batch test may be made by filling a tube with a known volume of extract-containing adsorbent and passing the proposed liquid stripping agent through the tube until substantially all the extract has been replaced. The volume of liquid stripping agent necessary per volume of adsorbent can be readily ascertained. This data can be used to calculate flow values for both batch and continuous operations; however, a test utilizing a moving adsorbent may be made to calculate values for a continuous unit, if desirable. If the stripping operation is to be conducted at a slightly elevated temperature, the test should be carried out at the proposed operating temperature.

The variables in the stripping process are preferably adjusted to produce a reactivated adsorbent which has a high activity. In some cases, however, operation is possible with adsorbent having as low as 50% of original activity, or possibly lower. This activity can best be determined by a test carried out similar to the method outlined below.

Add 1 gram of reactivated adsorbent per cc. of solution to a flask containing a measured volume (about 250 cc.) of ethyl alcohol. Allow to stand two hours, withdraw the liquid and analyze (such as by distillation) to determine the volume of extract retained by the adsorbent. Calculate the cc. of extract remaining on a gram of adsorbent after reactivation. Determine the cc. of extract adsorbed per gram of new sample of adsorbent by placing a weighed amount of adsorbent in a flask containing about 25 cc. of the mixture to be fractionated. Let stand two hours, analyze the remaining solution and calculate the amount of extract adsorbed. If all figures are expressed as cc./gram, the per cent activity is then given by the relation:

strued as limiting the invention to the precise details set forth.

*Example 1.*—A batch adsorption column, 2 inches in diameter and 10 feet long, similar to the one shown in Figure 1, is filled with 4,670 grams of silica gel. A kerosene distillate having API gravity of 40.5° and an aniline point of 132° F. is fed to the column at the rate of 1800 cc. per hour, or at a volume ratio of 0.77 cc. of feed per gram of silica gel per cycle. When the column is filled with the kerosene distillate, extract from the previous run is fed into the column at a rate of 1800 cc. per hour. Raffinate having a gravity of 43.9° API and an aniline point of 155° F. is forced out of the column. A recovery of raffinate equivalent to 62.7% of the feed is accomplished. When extract appears in the raffinate outlet stream, the flow of extract is stopped. Isooctane at 70° F. is then fed into the column at a rate of 1800 cc. per hour and at a ratio of 3.96 cc. of isooctane per gram of silica gel per cycle. Isooctane stripping is continued for 10 hours. The isooctane and extract are separated by fractional distillation. The extract recovered has a gravity of 36.4° API and an aniline point of 63° F. A sample of the reactivated gel was desorbed with a quantity of ethyl alcohol and the amount of extract remaining was calculated. The activity of this silica gel after ten hours of stripping with isooctanes at 70° F. was 66.2%.

*Example 2.*—A kerosene distillate having a gravity of 40.3° API and an aniline point of 135° F. is fed at a rate of 1800 cc. per hour to the column described in Example 1. 4,670 grams of 14 to 20 mesh silica gel is charged to the column. The column is filled with extract, and raffinate having a gravity of 45.1° API and an aniline point of 161° F. is removed in an amount equivalent to 62.0% of the feed. The extract is removed with isooctane at 212° F., 1800 cc. of isooctane per hour being used over a ten hour period, or in a volume ratio of 3.86 cc. of isooctane per gram of silica gel. The gel reactivated by this method has 88% original activity.

*Example 3.*—A petroleum fraction, boiling in the range of 470° F. to 670° F., and having a gravity of 26.5° API and an aniline point of 127° F. is charged to the column described in Example 1. Raffinate displaced from the column with extract at a rate of 1800 cc. per hour, is recovered in an amount equivalent to 53.6% of the feed, has a gravity of 28.6° F. and an aniline point of 140° F. The extract is removed with isooctane at 212° F. at a rate of 1800 cc. per hour and with a volume ratio of 3.86 cc. of isooctane per gram of gel. The reactivated gel has 78.6% of original activity.

$$\text{Per cent activity} = \frac{\text{Extract adsorbed by new} - \text{Extract remaining after reactivation}}{\text{Extract adsorbed by new adsorbent}} \times 100$$

Normally solid or gaseous compounds, especially those readily liquified, are within the scope of this invention, since they may be changed to liquids for use as liquid stripping agents by appropriate coordination of two normal process variables, namely, temperature and pressure. For example, this process is readily adaptable to the use of propane as a liquid stripping agent by slightly increasing operating pressures or lowering operation temperatures.

Several specific examples of applications of this process are given below to illustrate this invention. These examples should not be con-

*Example 4.*—The column described in Example 1 is filled with 4,670 grams of 14 to 20 mesh silica gel. A kerosene distillate having a gravity of 40.3° API and an aniline point of 135° F. is fed into the column at a rate of 1800 cc. per hour. After the column is filled with the kerosene distillate, raffinate is desorbed from the column by an extract having a gravity of 37.9° API and an aniline point of 36° F. Raffinate removed at a rate of 1800 cc. per hour has a gravity of 43.2° API and an aniline point of 151° F. The volume of raffinate recovered is equivalent to 78.8% of the feed. The extract is stripped from the adsorbent with isooctane at 320° F. for ten hours and at a ratio of 3.86 cc./gram of gel. The reactivated gel has 87.5% of its original activity.

*Example 5.*—4670 grams of 10–14 mesh silica gel contained in the batch column described in Example 1 is saturated with carbon tetrachloride from a previous run. A mixture of 50–50 isooctane-toluene is fed to the column at a rate of 900 cc./hour until 2800 cc. of feed has been introduced. Extract (toluene) is then fed to the column at a rate of 900 cc./hour until 3600 cc. have been introduced. 3004 cc. of raffinate containing carbon tetrachloride is removed from the column, 1084 cc. of carbon tetrachloride free raffinate is recovered, and contains 74% isooctane and 26% toluene. Stripping agent (carbon tetrachloride) is fed to the column at a rate of 1800 cc./hour for ten hours at a temperature of 70° F. 5100 cc. of extract containing carbon tetrachloride is recovered which gives 4246 cc. of extract analyzing 86% toluene and 14% isooctane. Additional toluene is recovered from the stripping agent. The adsorbent has 90% of its original activity after this stripping treatment. Stripping agent is separated from raffinate and extract fractions by fractional distillation. The first 100 cc. of raffinate recovered in this run was substantially pure isooctane. It is therefore obvious that this operation may be used to prepare substantially pure isooctane either by taking a suitably small raffinate cut or by increasing the length of the column.

*Example 6.*—2800 cc. of a diesel oil having an aniline point of 127° F. and a diesel index of 33.5 are fed to the batch column described above at a rate of 1800 cc. per hour. Extract is then used to displace the raffinate fraction which has an aniline point of 155° F. and a diesel index of 49.5. The extract is removed from the adsorbent with isooctane at 212° F. The isooctane is passed at a rate of 1800 cc. per hour for 16.4 hours. The activity of the gel after stripping is 91% of its original activity.

*Example 7.*—5247 grams of four to eight mesh activated alumina is charged to the batch column described. The column is filled with kerosene distillate having an aniline point of 132° F. and a gravity of 40.5° API. Extract from a previous run is fed to the column and a raffinate with an aniline point of 144° F. and a gravity of 42.5° API is removed. The alumina is reactivated by stripping with isooctane at 212° F. for ten hours and regains 87.5% of its original activity.

*Example 8.*—A continuous adsorption unit similar to the one shown in Figure 2 and composed of an 8′ by 1.7″ adsorption column and an 8′ by 1.5″ stripping column is charged with eight to fourteen mesh silica gel. A fifty-fifty mixture of toluene-isooctane is fed to the adsorption column at a point about three feet from the top of said column and at a rate of about 202 cc. per hour. Adsorbent passes down the column at a rate of about 600 grams per hour carrying the extract fraction with it, said extract collecting in the extract zone. The adsorbent (with extract) is carried to the stripping column where it is stripped as it passes down said column by a stripping agent passing up said column. The stripping agent in this case is a paraffin cut of a petroleum hydrocarbon boiling between 275° and 300° F., and the stripping operation is carried on at a temperature of about 200° F. The stripping agent-extract mixture is removed at a rate of about 800 cc. per hour and contains about 71.8% stripping agent, 27.0% toluene, and 1.2% isooctane. The stripped adsorbent, containing stripping agent is transferred to the top of the adsorption column to complete its operational cycle. Raffinate is removed from the top of this adsorption column at a rate of about 324 cc. per hour and contains about 29.0% isooctane, 1.5% toluene, and 69.5% stripping agent. The raffinate and extract fractions are separated from the stripping agent by distillation. The stripping agent-free raffinate contains 95.1% isooctane and 4.9% toluene, while the stripping agent-free extract contains 95.8% toluene and 4.2% isooctane. 124 cc. of extract are fed back to the bottom of the adsorption column as reflux, and 101 cc. per hour are removed as net extract.

*Example 9.*—600 grams per hour of six to forty mesh silica gel is circulated in a continuous adsorption unit as shown in Figure 2 and described in Example 8. 203 cc. of a fifty-fifty toluene-isooctane mixture is fed to the column at a point three feet down from the top. The adsorption operation is carried out at a temperature of about 70° F. Pentane is used as the stripping agent in this case and is fed to the bottom of the stripping column at a rate of 2400 cc. per hour and at a temperature of about 70° F. Stripping agent and extract are removed from the stripping column at a rate of about 2400 cc. per hour and contains about 8.6% toluene, 0.4% isooctane and 91.0% pentane. Raffinate is removed from the top of the adsorption column at a rate of 324 cc. per hour and contains about 29.0% isooctane and 4.0% toluene and 67.0% pentane. The raffinate and extract are freed of pentane by fractional distillation, the raffinate fraction contains about 88% isooctane and 12% toluene, while the extract fraction contains about 95% toluene and 5% isooctane. 124 cc. per hour of extract reflux is used and 93 cc. per hour of net extract is removed.

While the character of this invention has been described in considerable detail and various illustrations have been given of a liquid stripping operation, it is to be understood that the invention in its broader aspects is not limited thereto but includes numerous modifications and variations of liquid stripping processes for the reactivation of a spent adsorbent, which are of the scope of the appended claims.

I claim:

1. A process for the continuous separation of components of a liquid solution of organic compounds amenable to separation by preferential adsorption on a solid adsorbent, which comprises maintaining in an adsorption zone a mass of a solid adsorbent of substantially constant average adsorptive effectiveness by continually withdrawing from said zone adsorbent containing as an adsorbate the preferentially adsorbable component and adding to said zone adsorbent substantially free of said component, continually feeding the liquid solution undergoing separation into contact with said mass of adsorbent to effect separation of the preferentially adsorbable component as an adsorbate on the adsorbent, separating said adsorbate from the adsorbent withdrawn from the adsorption zone by passing in contact therewith a stream of a desorbing liquid which is non-preferentially adsorbable with respect to said adsorbate and which is at an elevated temperature below about 300° F., in sufficiently large amount to effect desorption into and removal of said adsorbate with the stream of desorbing liquid by displacement from the adsorbent of the preferentially adsorbed component and substitution of the non-preferentially adsorbed desorbing liquid therefor, continually adding the thus treated adsorbent containing the substituted non-preferentially adsorbed liquid to the adsorption zone as the specified adsorbent free of said preferentially adsorbed component.

2. A process for the continuous separation of components of a liquid solution of organic compounds amenable to separation by preferential adsorption on a solid adsorbent, which comprises maintaining in an adsorption zone a mass of a solid adsorbent of substantially constant average adsorptive effectiveness by continually withdrawing from the adsorption zone adsorbent containing as an adsorbate the preferentially adsorbable component of said solution and adding to said zone adsorbent free of said component, continually feeding the liquid solution undergoing separation into contact with said mass of adsorbent to effect separation of the preferentially adsorbable component as an adsorbate on the adsorbent, separating said adsorbate from the adsorbent withdrawn from the adsorption zone by passing in contact therewith a stream of a desorbing liquid which is non-preferentially adsorbable with respect to said adsorbate and which is at an elevated temperature below about 300° F., in sufficiently large amount to effect desorption and removal of said adsorbate in the stream of desorbing liquid by displacement of the preferentially adsorbed component into said stream and substitution on the adsorbent of the non-preferentially adsorbed desorbing liquid therefor, returning a portion of the thus separated adsorbate as reflux to the adsorption zone to facilitate separation of the less preferentially adsorbed component of the feed solution, and continually adding the adsorbent containing the substituted non-preferentially adsorbed liquid to the adsorption zone as the specified adsorbent free of said preferentially adsorbed component.

3. In a process for the fractionation of a liquid solution of organic compounds by adsorption wherein the solution is contacted with a suitable solid adsorbent to produce an adsorbate fraction comprised of the preferentially adsorbable constituents of the solution and a residual non-adsorbed fraction and wherein both fractions are recovered as process products, the improved method which comprises continuously moving a particle-form solid adsorbent aggregated into a columnar mass downwardly by controlled gravity flow through an adsorption zone in counterflow to the liquid solution undergoing fractionation, continuously withdrawing the adsorbent containing the adsorbate fraction from the lower portion of the adsorption zone, continuously moving the withdrawn adsorbent aggregated into a columnar mass downwardly by controlled gravity flow through a stripping zone in counterflow to an adsorbable organic liquid for which the adsorbent has a lower adsorptive preference than it has for the adsorbate, passing said counterflowing adsorbable organic liquid into the stripping zone in sufficient quantity to substantially remove the adsorbate from the adsorbent and replace it thereon, maintaining adjacent the stripping zone a column of said adsorbable organic liquid, said column having a vertically extending portion of sufficient height to balance the column of liquid in the stripping zone, continuously withdrawing the adsorbent from the lower portion of the stripping zone through said column and returning the withdrawn adsorbent containing said substituted adsorbable liquid of lower adsorptive preference to the upper portion of the adsorption zone.

4. In a process for the fractionation of a liquid solution of organic compounds wherein the solution is contacted with a suitable solid adsorbent to separate an adsorbate comprised of the preferentially adsorbable components of the solution and a residual non-adsorbed liquid comprised of the less preferentially adsorbable components of the solution the improved method which comprises continuously moving particles of the adsorbent aggregated into a columnar mass downwardly by controlled gravity flow through an adsorption zone, continuously introducing said solution into contact with the moving adsorbent at an intermediate point in the adsorption zone and continuously withdrawing said residual liquid from the upper portion of the adsorption zone, maintaining adjacent the adsorption zone a column of previously separated adsorbate in free fluid intercommunication with the lower portion of the adsorption zone, said column having a vertically extending portion of sufficient height to balance the column of liquid in the adsorption zone, continuously withdrawing the solid adsorbent from the lower portion of the adsorption zone through said column, continuously moving the withdrawn adsorbent aggregated into a columnar mass downwardly through a stripping zone, continuously introducing an adsorbable liquid for which the adsorbent has a lower adsorptive preference than it has for the adsorbate into contact with the moving adsorbent in the lower portion of the stripping zone to remove the adsorbate from the adsorbent and replace it thereon, continuously withdrawing a mixture of said adsorbable liquid and displace adsorbate from the upper portion of the stripping zone, maintaining adjacent the stripping zone a column of said adsorbable liquid in free fluid intercommunication with the lower portion of the stripping zone, said column of adsorbable liquid having a vertically extending portion of sufficient height to balance the column of liquid in the stripping zone, continuously withdrawing the adsorbent from the lower portion of the stripping zone through said column of adsorbable liquid and returning the withdrawn adsorbent containing said substituted adsorbable liquid of lower adsorptive preference to the upper portion of the adsorption zone.

5. The method of treating petroleum distillates containing aromatic and paraffinic hydrocarbons to separate one fraction having a higher paraffinic content than the original distillate and one fraction having a higher aromatic content than the original distillate which comprises continuously moving a particle-form solid adsorbent aggregated into a columnar mass downwardly by gravity flow through an adsorption zone, continuously introducing the distillate into contact with the adsorbent at an intermediate point in the adsorption zone to separate an adsorbate having a higher aromatic content than the original distillate, continuously withdrawing a residual non-adsorbed fraction of the distillate having a higher paraffinic content than the original distillate from the upper portion of the adsorption zone, maintaining a body of previously separated adsorbate in free fluid intercommunication with the lower extremity of the adsorption zone, continuously withdrawing the adsorbent from the lower portion of the adsorption zone through said body of adsorbate, continuously moving the withdrawn adsorbent aggregated into a columnar mass downwardly by gravity flow through a stripping zone, continuously introducing a hydrocarbon liquid for which the adsorbent has a lower adsorptive preference than it has for the adsorbate into the lower portion of the stripping zone under conditions adapted to cause the removal of the adsorbate from the adsorbent and its replacement thereon by said hydrocarbon liquid, continuously removing a mixture of said hydrocarbon liquid and removed adsorbate from the upper portion of the stripping zone and continuously removing the adsorbent containing said substituted hydrocarbon liquid of lower adsorptive preference from the lower portion of the stripping zone and returning it to the upper portion of the adsorption zone.

6. A process for the fractionation of kerosene distillates which comprises continuously moving particles of a solid adsorbent aggregated into a columnar mass downwardly by controlled gravity flow through an adsorption zone, continuously introducing the distillate in liquid phase into contact with the adsorbent at an intermediate point in the adsorption zone to separate as an adsorbate a fraction of the distillate characterized by a lower aniline point than that of the original distillate, continuously withdrawing from the upper portion of the adsorption zone a non-adsorbed fraction of the distillate characterized by a higher aniline point than that of the original distillate, maintaining adjacent the adsorption zone a column of previously separated low aniline point adsorbate, said column being in free fluid intercommunication with the lower portion of the adsorption zone and having a vertically extending portion of sufficient height to balance the column of liquid in the adsorption zone, continuously withdrawing the adsorbent containing the said low aniline point adsorbate from the lower portion of the adsorption zone through said column, continuously moving the withdrawn adsorbent aggregated into a columnar mass by controlled gravity flow downwardly through a stripping zone, continuously introducing into contact with the adsorbent in the lower portion of the stripping zone a hydrocarbon liquid for which the adsorbent has a lower adsorptive preference than it has for the adsorbate in quantity sufficient to remove the adsorbate from the adsorbent and replace it thereon, continuously withdrawing from the upper portion of the stripping zone a mixture of said hydrocarbon liquid and removed adsorbate and continuously withdrawing the adsorbent containing said substituted hydrocarbon liquid of lower adsorptive preference from the lower portion of the stripping zone and returning it to the upper portion of the adsorption zone.

7. The method as defined in claim 3 wherein the stripping zone is maintained at an elevated temperature below about 300° F.

8. The method as defined in claim 3 wherein the liquid solution of organic compounds undergoing separation is a petroleum distillate and the solid adsorbent is silica gel.

9. The method as defined in claim 3 wherein the liquid solution of organic compounds undergoing separation is a petroleum distillate, wherein the adsorbent is silica gel and wherein the adsorbable organic liquid passed into the stripping zone consists essentially of paraffinic hydrocarbons.

10. The method as defined in claim 3 wherein the liquid solution of organic compounds comprises aromatic and paraffinic hydrocarbons, wherein the adsorbent is silica gel and wherein the adsorbable organic liquid passed into the stripping zone consists essentially of paraffinic hydrocarbons.

11. The method as defined in claim 5 wherein the stripping zone is maintained at an elevated temperature below about 300° F.

12. The method as defined in claim 5 wherein the adsorbent is silica gel and the hydrocarbon liquid introduced into the stripping zone consists essentially of paraffinic hydrocarbons.

13. In an adsorption separation process wherein a solid adsorbent is contacted with a liquid solution of organic compounds to separate an adsorbate fraction comprised of the preferentially adsorbable components of the solution and a residual non-adsorbed fraction, the method of recovering the adsorbate from the adsorbent and regenerating the adsorbent for re-use which comprises continuously moving the adsorbate-containing adsorbent aggregated into a columnar mass downwardly through a stripping zone, continuously introducing an adsorbable liquid for which the adsorbent has a lower adsorptive preference than it has for the adsorbate into contact with the moving adsorbent in the lower portion of the stripping zone to remove the adsorbate from the adsorbent and replace it thereon, continuously withdrawing a mixture of said adsorbable liquid and displaced adsorbate from the upper portion of the stripping zone, maintaining adjacent the stripping zone a column of said adsorbable liquid in free fluid intercommunication with the lower portion of the stripping zone, said column of adsorbable liquid having a vertically-extending portion of sufficient height to balance the column of liquid in the stripping zone, and continuously withdrawing the adsorbent from the lower portion of the stripping zone through said column of adsorbable liquid.

14. The method as defined in claim 13 wherein the adsorbable liquid passed into contact with the adsorbent in the stripping zone is at an elevated temperature below about 300° F.

WILLIAM H. CLAUSSEN.

REFERENCES CITED

The following references are of record in the file of this patent:

UNITED STATES PATENTS

| Number | Name | Date |
|---|---|---|
| 1,882,000 | Cross | Oct. 11, 1932 |
| 2,384,311 | Kearby | Sept. 4, 1945 |
| 2,395,491 | Mavity | Feb. 26, 1946 |
| 2,398,101 | Lipkin | Apr. 9, 1946 |
| 2,425,535 | Hibshman | Aug. 12, 1947 |
| 2,470,339 | Claussen et al. | May 17, 1949 |

OTHER REFERENCES

Gurwitsch et al., "The Scientific Principles of Pet. Technology," Chapman and Hall, Ltd., London (1932), pages 484 to 486.